United States Patent [19]

Lyons

[11] 3,954,252
[45] May 4, 1976

[54] OVERCENTER LOAD BINDER
[76] Inventor: Stanley E. Lyons, 18003 Galatea, Azusa, Calif. 91702
[22] Filed: Sept. 2, 1975
[21] Appl. No.: 609,190

[52] U.S. Cl. ................................................ 254/78
[51] Int. Cl.² ......................................... B66F 3/00
[58] Field of Search ............................. 254/73–82; 105/368 T; 280/179 A; 248/505, 500

[56] References Cited
UNITED STATES PATENTS

| | | | |
|---|---|---|---|
| 2,564,821 | 8/1951 | Smith | 254/78 |
| 2,824,717 | 2/1958 | Yeager | 254/78 |
| 2,919,895 | 1/1960 | Johnson | 254/78 |
| 3,218,031 | 11/1965 | Lucas | 254/78 |
| 3,862,742 | 1/1975 | James | 254/78 |

Primary Examiner—Al Lawrence Smith
Assistant Examiner—Robert C. Watson
Attorney, Agent, or Firm—William P. Green

[57] ABSTRACT

An overcenter load binder to be connected to and tighten toward one another two chains or the like, and including two tension elements connectable to the chains respectively, and an actuating lever pivoted to the tension elements at different locations to attain an overcenter tightening action, with one of the tension elements having a bifurcated portion with two arms between which the lever is received in a load tightening position, and with those arms containing two aligned apertures for receiving a padlock or the like at a location blocking load releasing swinging movement of the lever.

8 Claims, 7 Drawing Figures

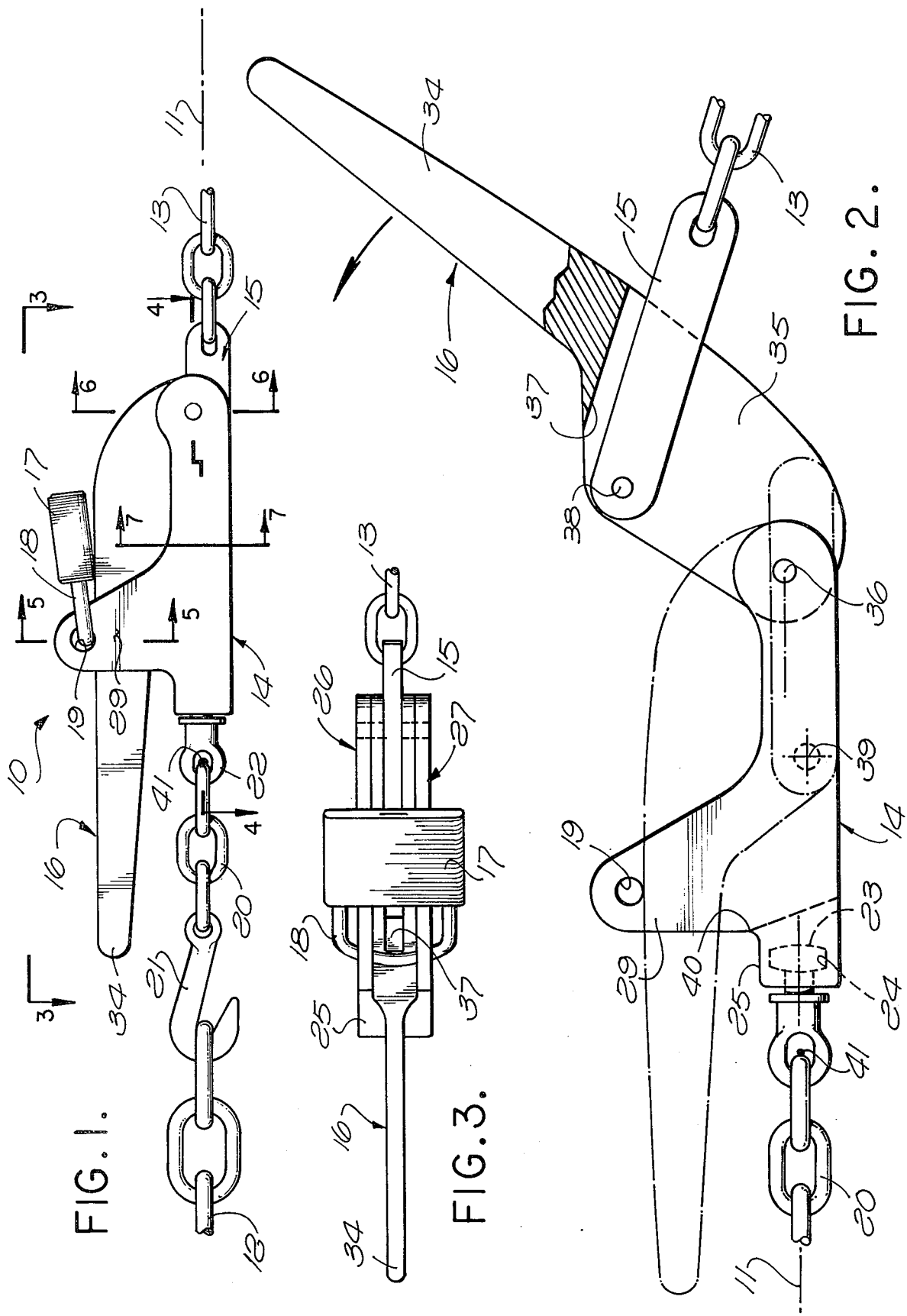

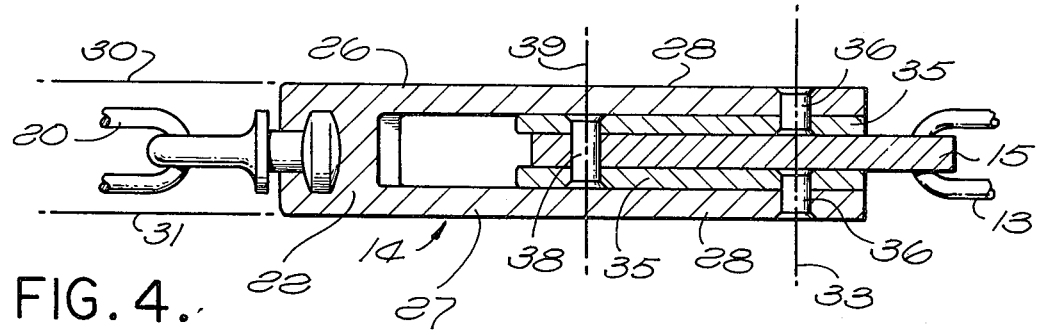
FIG. 4.
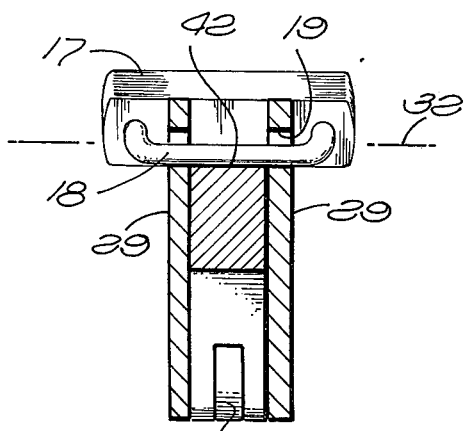
FIG. 5.
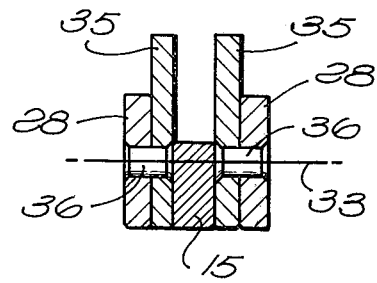
FIG. 6.
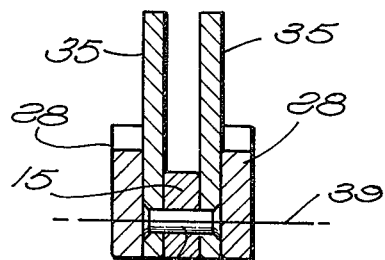
FIG. 7.

OVERCENTER LOAD BINDER

BACKGROUND OF THE INVENTION

This invention relates to improved load binders for releasably tightening two chains, cables, or other elements toward one another, as for instance in tightening a chain or cable about a load on a truck.

The load binders of the present invention are of a known general type including two tension elements which are adapted to be attached to the ends of a pair of chains or other members which are to be interconnected, and including also a lever connected to the tension elements for swinging movement relative thereto between load tightening and released conditions. The lever is attached to the two tension elements by different pivotal connections having axes spaced apart in a relation causing the two tension elements to be pulled toward one another and tighten the load in response to the swinging movement of the lever, with one of these pivotal axes ultimately moving to a slightly overcenter position with respect to the other.

There have been proposed in the past arrangements for latching or locking such overcenter load binders in their load tightening positions, such as for example the structures shown in U.S. Pat. Nos. 3,418,008 and 2,947,514.

SUMMARY OF THE INVENTION

The present invention provides an improved locking structure for an overcenter load binder of the above discussed general type. This locking arrangement is such as to enable the user to quickly and easily lock the actuating lever of the device in a tightened condition by a padlock or its equivalent, with the portion of the structure to which the padlock is connected being specially designed for very easy access in the tightened condition. At the same time, the arrangement is extremely simple and inexpensive to manufacture, and may involve very little if any added cost over and above the cost of a conventional binder which is not capable of being locked.

To attain these results, I form one of the tension elements to have a bifurcated portion forming a pair of arms which are spaced apart and so located that an intermediate portion of the actuating lever is received between these arms in the load tightening condition of the device. The two arms contain aligned apertures through which the locking loop of a padlock, or a pin or other locking part, can extend in a position in which this locking element blocks swinging movement of the actuating lever from its tightened condition and toward its released condition. The two arms preferably project laterally toward the side of the tension elements at which the actuating lever swings between its tightened and released conditions. This side at which the swinging action occurs is of course normally an outer side which is readily accessible to a user, thus rendering the locking arms and their apertures also readily accessible, and facilitating easy locking and unlocking of the device as discussed above. The bifurcated portion of the tension element which forms the two locking arms also preferably forms two additional arms, which may project generally perpendicular to the first mentioned arms, and which carry the pivotal connections by which that tension element is attached to the actuating arm. The actuating lever itself may also be bifurcated, to receive and be pivotally attached to the second of the tension elements at a location within that bifurcated portion of the lever.

BRIEF DESCRIPTION OF THE DRAWINGS

The above and other features and objects of the invention will be better understood from the following detailed description of the typical embodiment illustrated in the accompanying drawings in which:

FIG. 1 is a side view of a load binder constructed in accordance with the invention;

FIG. 2 illustrates the device of FIG. 1 in its released condition;

FIG. 3 is a plan view taken on line 3—3 of FIG. 1;

FIG. 4 is an enlarged fragmentary section taken on line 4—4 of FIG. 1; and

FIGS. 5, 6 and 7 are enlarged vertical sections taken on lines 5—5, 6—6 and 7—7 respectively of FIG. 1.

DESCRIPTION OF THE PREFERRED EMBODIMENT

Referring first to FIG. 1, there is illustrated at 10 a load binder which is constructed in accordance with the invention, and which is to be utilized for pulling toward one another along an axis 11 two chains, cables, or other similar elements represented at 12 and 13. These chains may typically extend about a number of pipes, logs, containers, or other load elements to be held in place on a truck or other support structure, or may be utilized in any other situation whether it may be desirable to connect chains 12 and 13 tightly together. In some instances, the two chains 12 and 13 may actually be opposite ends of a single chain which has been looped about a load.

The device 10 includes two tension elements 14 and 15 which are connected to the two chains respectively, and an actuating lever 16 which serves by swinging movement from its FIG. 2 position to its FIG. 1 position to pull chains 12 and 13 relatively together. The invention is particularly concerned with construction of these elements to be locked in the FIG. 1 tightened condition by a padlock 17 whose U-shaped locking element 18 is received within two aligned openings 19 in tension element 14.

The tension element 14 may carry a short length of chain 20 having a hook 21 at its end for detachable connection to chain 12. At its opposite end, the short chain 20 may be connected to an eye element 22 which may have an enlarged head 23 at one end connected into a socket 24 in a portion 25 of tension element 14 in a relation allowing swiveling movement of eye 22 relative to tension element 14 about axis 11.

Rightwardly of its socket portion 25, element 14 is bifurcated, to form two identical laterally spaced halves 26 and 27 (see FIG. 4), which form a first pair of spaced identical arms 28 projecting rightwardly in the figures, essentially parallel to axis 11, and a second pair of identical arms 29 which project upwardly in FIG. 1, in laterally spaced relation, and essentially perpendicular to arms 28. With reference to FIG. 4, these two spaced halves 26 and 27 of element 14, and their arms 28 and 29, may be considered as lying within two spaced parallel planes 30 and 31 which extend vertically in FIG. 1 and parallel to but at opposite sides of the tension axis 11. The two previously mentioned padlock openings 19 are formed in the upper ends of upwardly projecting arms 29, and may be circular and centered about a common axis 32 which extends horizontally in FIGS. 1 and 2 and perpendicular to planes 30 and 31.

The actuating lever 16 is mounted to swing about an axis 33 relative to tension element 14, and has an elongated handle portion 34 which projects radially outwardly from axis 33 as shown. The lever 16 may be bifurcated at its end near the pivotal axis 33, to form two spaced identical arms 35 (see FIGS. 2 and 4) which are pivoted to the ends of arms 28 of element 14 by two aligned pivot pins 36. These arms may merge together at the location of a shoulder 37 (FIG. 2) formed in the lever beyond which shoulder the handle portion 34 of the lever may be solid and not bifurcated.

The arms 35 of lever 16 may be enlarged to have the peripheral shape illustrated in FIG. 2, and are pivotally connected to the second tension element 15 by extension of that tension element into the space provided between the two arms 35 of the bifurcated portion of lever 15, and provision of a pivot pin 38 extending through corresponding openings in element 15 and arms 35. The pivotal axis 39 of this connection formed by pin 38 is parallel to but spaced from pivotal axis 33.

When it is desired to place the illustrated binder in use, a user first pulls the chains 12 and 13 manually together as closely as possible, with actuating lever 16 in its released FIG. 2 condition, and then attaches hook 21 to chain 12. He then swings lever 16 about axis 33 relative to element 14, and from the FIG. 2 position to the FIG. 1 position, with handle 34 ultimately moving to a position between the upstanding arms 29 of element 14. This swinging movement is limited in the FIG. 1 condition by engagement of lever 16 with the non-bifurcated portion 22 of element 14 at 40. In that position, the axis 39 of the pivotal connection between elements 15 and 16 is in an overcenter position, just slightly beyond the tensional axis 11 of the device, that is, just beyond a line extending between axis 33 and the point 41 at which element 14 exerts pulling force against chain 12. Also, in this tightened overcenter condition, the portion of the upper surface 42 of lever 16 which is adjacent openings 19 in arms 28 of element 14 is received just slightly beneath the level of those openings so that the locking element 18 of padlock 17 can be slipped through openings 19 and across the upper side of lever surface 42, to effectively block upward movement of the lever and lock it in holding condition. Any slight upward movement of lever 16 which is permitted is not sufficient to move pivotal axis 39 upwardly beyond tension axis 11, so that the padlock very positively retains the lever in its overcenter condition. In lieu of the padlock 17 it is contemplated that in some instances a pin or other element may be inserted through openings 19 to attain a similar latching action.

While a certain specific embodiment of the present invention has been disclosed as typical, the invention is of course not limited to this particular form, but rather is applicable to broadly to all such variations as fall within the scope of the appended claims.

I claim:

1. An overcenter load binder for interconnecting two members and tightening them toward one another, comprising:
    a first tension element adapted to be connected to one of said members and having a bifurcated portion defining two spaced arms;
    a second tension element adapted to be connected to the other of said members;
    an actuating lever having a swinging handle portion at one end thereof;
    first pivotal connection means attaching said lever toward a second end thereof to said first tension element for relative swinging movement about a first pivotal axis between a load tightening position in which an intermediate portion of said lever between said handle and said first axis is received between said two arms of said first tension element, and a released position; and
    second pivotal connection means attaching said second tension element to said lever for relative pivotal movement about an axis offset from said first pivotal axis at a location to pull said members relatively together and be slightly overcenter with respect to said first axis when the lever is in said load tightening position;
    said two arms of said first tension element having portions projecting outwardly beyond said intermediate portion of said lever in said load tightening position thereof and containing aligned apertures adapted to receive a locking part in a position of extension through said apertures and across an outer side of said intermediate portion of said lever between said arms in a relation blocking swinging movement of said lever from said load tightening position to said released position.

2. An overcenter load binder as recited in claim 1, in which said handle portion of the lever in swinging between said load tightening and released positions swings outwardly at a predetermined side of said tension elements, said first tension element having an attaching portion through which it is secured to said one member and from which said two arms project in a direction toward said predetermined side of said first tension element at which said lever swings.

3. An overcenter load binder as recited in claim 1, in which said second end of said lever is bifurcated to form two spaced projections between which said second tension element is received and to which said second tension element is pivotally connected by said second pivotal connection means.

4. An overcenter load binder as recited in claim 1, in which said two apertures of said arms are adapted to receive the locking part of a padlock.

5. An overcenter load binder as recited in claim 1, including a padlock having its locking part extending through and between said apertures of said arms.

6. An overcenter load binder as recited in claim 1, in which said bifurcated portion of said first tension element has two additional arms received at opposite sides of said lever and projecting generally perpendicular to said first arms.

7. An overcenter load binder as recited in claim 1, in which said bifurcated portion of said first tension element has two additional arms received at opposite sides of said lever and projecting generally perpendicular to said first arms, said first pivotal connection means including two aligned pivotal connections attaching said two additional arms respectively to said lever.

8. An overcenter load binder as recited in claim 7, in which said lever is bifurcated to form two arms connected to said two additional arms respectively of said first tension element by said two aligned pivotal connections respectively, said second tension element extending into said bifurcated portion of said lever between said two arms thereof and being pivotally connected to the lever by said second connection means at a location between said arms of the lever.

* * * * *